US010618542B2

(12) United States Patent
Cai

(10) Patent No.: US 10,618,542 B2
(45) Date of Patent: Apr. 14, 2020

(54) FOLDABLE STROLLER FRAME AND FOLDABLE STROLLER

(71) Applicant: JIANGSU LITTLE DINOSAUR CHILDREN'S PRODUCTS GROUP CO., LTD., Kunshan, Jiangsu Province (CN)

(72) Inventor: Shoujin Cai, Kunshan (CN)

(73) Assignee: JIANGSU LITTLE DINOSAUR CHILDREN'S PRODUCTS GROUP CO., LTD., Kunshan (CN)

( * ) Notice: Subject to any disclaimer, the term of this patent is extended or adjusted under 35 U.S.C. 154(b) by 46 days.

(21) Appl. No.: 15/684,324

(22) Filed: Aug. 23, 2017

(65) Prior Publication Data
US 2018/0154919 A1 Jun. 7, 2018

(30) Foreign Application Priority Data

Dec. 6, 2016 (CN) .......................... 2016 1 1111214
Mar. 22, 2017 (CN) .......................... 2017 1 0174861

(51) Int. Cl.
*B62B 7/08* (2006.01)
*B62B 7/10* (2006.01)

(52) U.S. Cl.
CPC ................ *B62B 7/086* (2013.01); *B62B 7/10* (2013.01); *B62B 2205/04* (2013.01); *B62B 2205/06* (2013.01)

(58) Field of Classification Search
CPC ............ B62B 7/10; B62B 7/086; B62B 7/062
See application file for complete search history.

(56) References Cited

U.S. PATENT DOCUMENTS 8,894,090 B1 * 11/2014 Chen ....................... B62B 7/086
  280/47.38
9,090,277 B1 * 7/2015 Chen ....................... B62B 7/086
(Continued)

FOREIGN PATENT DOCUMENTS

CN 101898575 A 12/2010
CN 204368228 U 6/2015
(Continued)

OTHER PUBLICATIONS

International Search Report Form PCT/ISA/210, International Application No. PCT/CN2017/099031, pp. 1-3.

*Primary Examiner* — Katy M Ebner
(74) *Attorney, Agent, or Firm* — Bond Schoeneck & King, PLLC; George McGuire

(57) ABSTRACT

A foldable stroller frame and a foldable stroller are provided. The foldable stroller frame may include, a front wheel bracket, and a rear wheel bracket rotatably connected to the front wheel bracket. An upper end of the rear wheel bracket is rotatably connected to a side handrail, and a rear end thereof is rotatably connected to a rear supporting bar. The side handrail and the rear supporting bar are rotatably connected to a push bar from different shafts. The rear wheel bracket is provided with a slidable sleeve to which a front wheel bracket link and a side handrail link are rotatably connected, respectively. An end of the front wheel bracket link that is not connected to the slidable sleeve is rotatably connected to the front wheel bracket, and an end of the side handrail link that is not connected to the slidable sleeve is rotatably connected to the side handrail.

10 Claims, 12 Drawing Sheets

(56) References Cited

U.S. PATENT DOCUMENTS

| | | | | |
|---|---|---|---|---|
| 9,096,250 B2* | 8/2015 | Cheng | ................... | B62B 7/068 |
| 9,295,321 B2* | 3/2016 | Herbault | ................ | B62B 7/086 |
| 9,517,788 B2* | 12/2016 | He | ........................ | B62B 7/086 |
| 9,540,027 B1* | 1/2017 | Hanson | .................. | B62B 7/004 |
| 9,834,243 B1* | 12/2017 | Zhang | ................... | B62B 7/086 |
| 9,950,730 B2* | 4/2018 | Gao | ...................... | B62B 7/062 |
| 2009/0008908 A1* | 1/2009 | Kassai | .................... | B62B 7/08 |
| | | | | 280/647 |
| 2019/0118847 A1* | 4/2019 | He | ........................ | B62B 9/20 |

FOREIGN PATENT DOCUMENTS

| | | |
|---|---|---|
| CN | 204452543 U | 7/2015 |
| CN | 106515833 A | 3/2017 |
| CN | 206255050 U | 6/2017 |
| CN | 106915376 A | 7/2017 |
| JP | 2011148449 A | 8/2011 |

\* cited by examiner

US 10,618,542 B2

FOLDABLE STROLLER FRAME AND FOLDABLE STROLLER

CROSS-REFERENCE TO RELATED APPLICATIONS

This application claims priority to Chinese patent application No. 201710174861.5 filed on Mar. 22, 2017 and Chinese patent application No. 201611111214.1 filed on Dec. 6, 2016, titled "Foldable Stroller Frame and Foldable Stroller", which are incorporated herein by reference in their entirety.

TECHNICAL FIELD

The present disclosure relates to the technical field of strollers and, more particularly, to a foldable stroller frame and a foldable stroller.

BACKGROUND

Strollers are a tool commonly found in daily life, such as a stroller for shopping, a stroller suitable for lying and sitting of babies, or the like. In order to facilitate carrying and storage when not in use, a baby stroller, for example, is generally configured to be foldable. Space occupied by the stroller is reduced by folding of the stroller.

There are a wide variety of kinds of frames of the existing foldable stroller, but either its structure is complex and structural strength is not high, or it is very inconvenient to be folded. Moreover, the foldable strollers are bulky after being folded, inconvenient for storage and placement, and cannot be adapted to the user's space for holding. These drawbacks may cause inconvenience to the users, make the user experience poor, and not conducive to market promotion.

SUMMARY

It is an object of the present disclosure to provide a foldable stroller frame and a foldable stroller to solve the existing problems of the foldable stroller, such as the structure is complicated and the folding is not convenient.

In order to achieve the propose, the present disclosure adopts the following technical solutions:

A foldable stroller frame includes a front wheel bracket and a rear wheel bracket rotatably connected to the front wheel bracket. An upper end of the rear wheel bracket is rotatably connected to a side handrail, and a rear end thereof is rotatably connected to a rear supporting bar. The side handrail and the rear supporting bar are rotatably connected to a push bar (4) from different shafts. The rear wheel bracket is provided with a slidable sleeve to which a front wheel bracket link and a side handrail link are rotatable connected, respectively. An end of the front wheel bracket link that is not connected to the slidable sleeve is rotatably connected to the front wheel bracket, and an end of the side handrail link that is not connected to the slidable sleeve is rotatably connected to the side handrail.

The present disclosure further provides a foldable stroller comprising the foldable stroller frame described above.

According to the configuration described above, the foldable stroller frame of the present disclosure can be folded more conveniently and quickly, and has a small volume and is convenient to carry and store after being folded, thus bring great convenience for the user. Furthermore, with the above configuration, it is possible to make the whole structure of stroller more stable as the stroller is unfolded.

DETAILED DESCRIPTION

Figure 1:
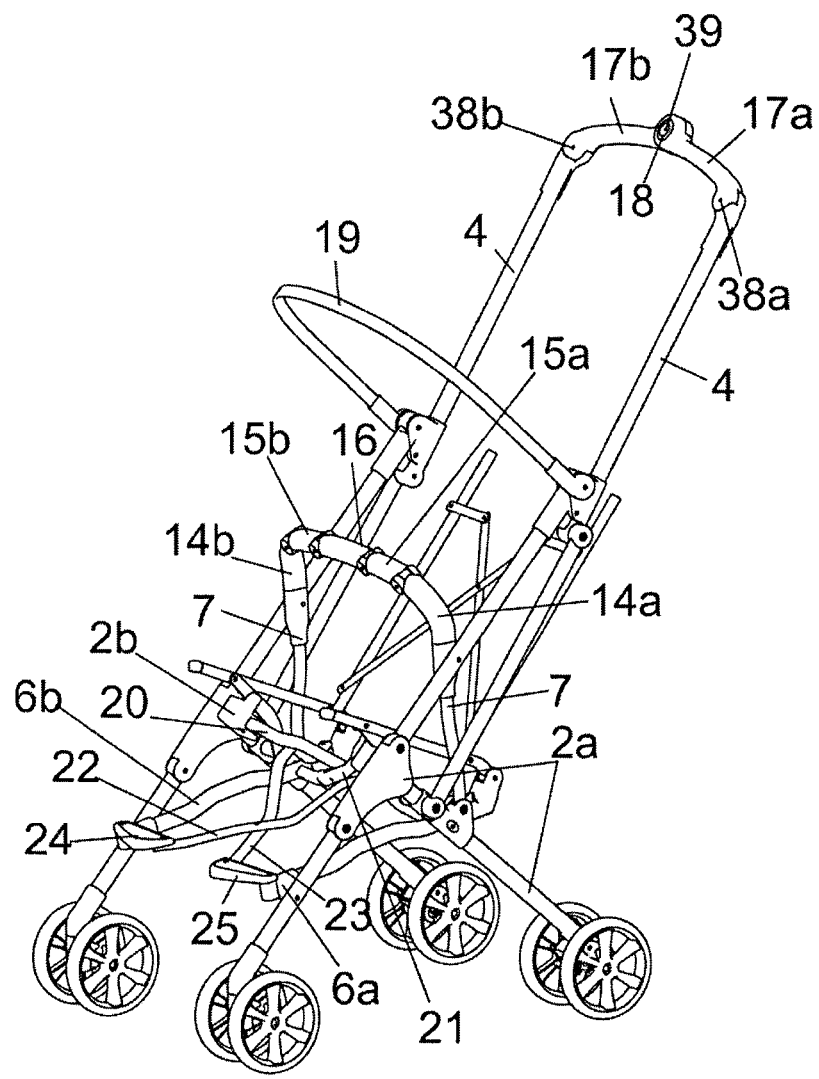
FIG. 1 is a perspective structural schematic view illustrating a foldable stroller frame according to a first embodiment.

Various embodiments will be further described below with reference to the drawings and by way of specific embodiments.

First Embodiment

The present embodiment provides a foldable stroller frame, and in the present embodiment, the directions such as "front", "rear", "left", "right", "upper" and "lower" as involved herein shall be illustrated as the direction toward which the user faces as he/she pushes the stroller. Namely, the front means the direction toward which the user faces directly as he/she pushes the stroller, based on this, each of the directions will be illustrated.

As shown in FIGS. 1-7, the foldable stroller frame includes a front wheel bracket 1, a rear wheel bracket 2, a side handrail 3, a push bar 4, a rear supporting bar 5, a front wheel bracket link 6, a side handrail link 7, a slidable sleeve 8, a front wheel assembly 11 and a rear wheel assembly 12.

The front wheel assembly 11 is mounted on the front wheel bracket 1, and the rear wheel assembly 12 is mounted on the rear wheel bracket 2.

Figure 2:
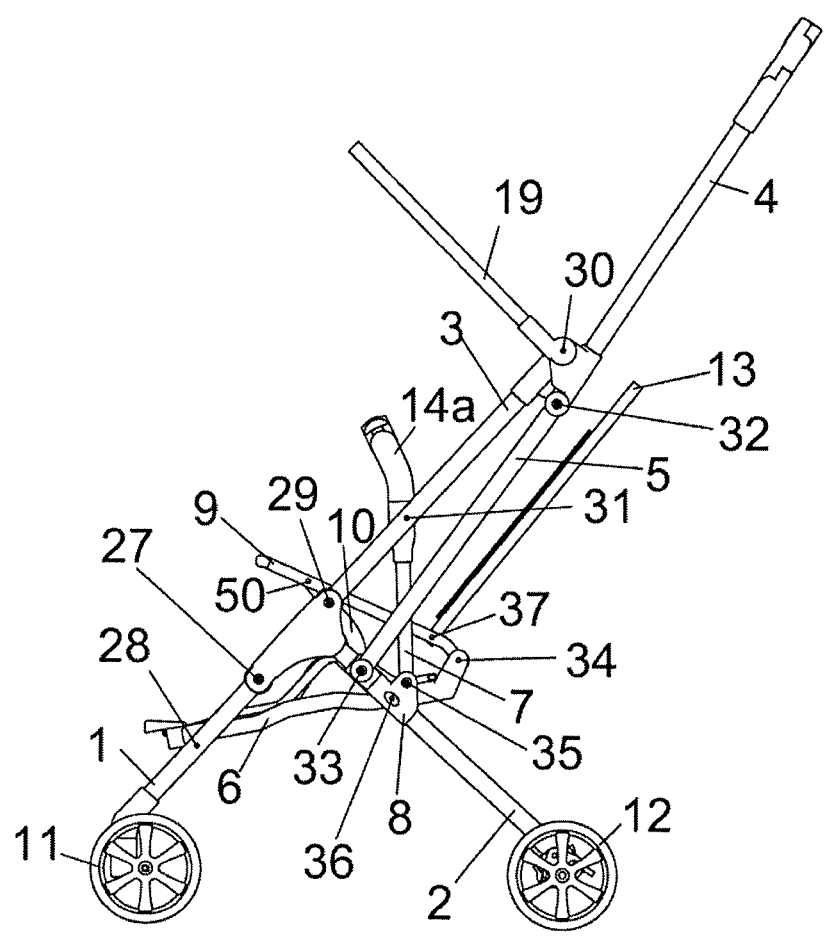
FIG. 2 is a side view illustrating the foldable stroller frame according to the first embodiment.

As shown in FIG. 2, the front wheel bracket 1 is rotatably connected to the rear wheel bracket 2 by means of a pin 27. In particularly, the rear wheel bracket 2 includes a left rear wheel bracket 2a and a right rear wheel bracket 2b that are rotatably connected to two sides of the front wheel bracket 1 by means of the pin 27, respectively.

An upper end of the rear wheel bracket 2 is rotatably connected to the side handrail 3 by means of a pin 29, and a rear end thereof is rotatably connected to the rear supporting bar 5 by means of a pin 33. The side handrail 3 is rotatably connected to the push bar 4 by means of a pin 30, and the push bar 4 is also connected with a front hood bar 19. In other words, the side handrails 3, the push bar 4 and the front hood bar 19 are rotatably connected to one another by the pin 30 in a coaxial manner, and the push bar 4 and the rear supporting bar 5 are rotatably connected to each other by means of a pin 32. In the present embodiment, a lower end of the push bar 4 is rotatably connected to the rear supporting bar 5 by means of the pin 32.

The rear wheel bracket 2 is provided with a slidable sleeve 8 which is rotatably connected to a front wheel bracket link 6 by a pin 36 and which is rotatably connected to a side handrail link 7 by a pin 35. One end of the front wheel bracket link 6 that is not connected to the slidable sleeve 8 is rotatably connected to the front wheel bracket 1 by means of a pin 28, and one end of the side handrail link 7 that is not connected to the slidable sleeve 8 is rotatably connected to the side handrail 3 by a pin 31. In particular, the slidable sleeve 8 may includes a slidable sleeve 8a and a slidable sleeve 8b in the present embodiment.

Figure 3:
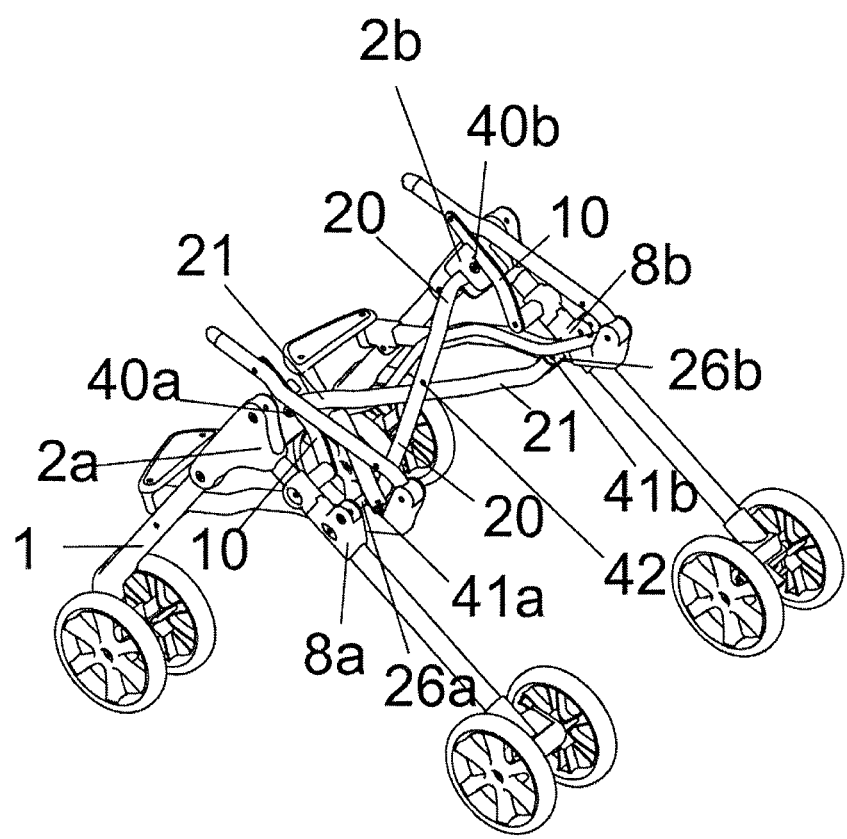
FIG. 3 is a schematic view illustrating a state of the foldable stroller frame according to the first embodiment with the upper half thereof being concealed.
Figure 4:
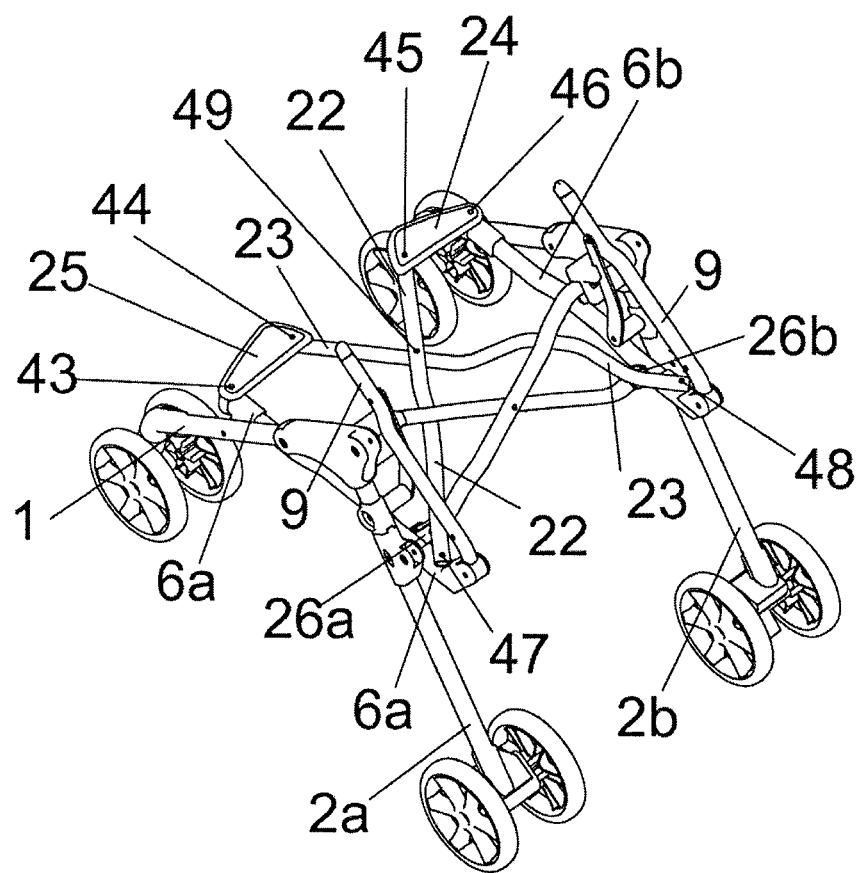
FIG. 4 is a schematic view illustrating another state of the foldable stroller frame according to the first embodiment with the upper half thereof being concealed.
Figure 5:
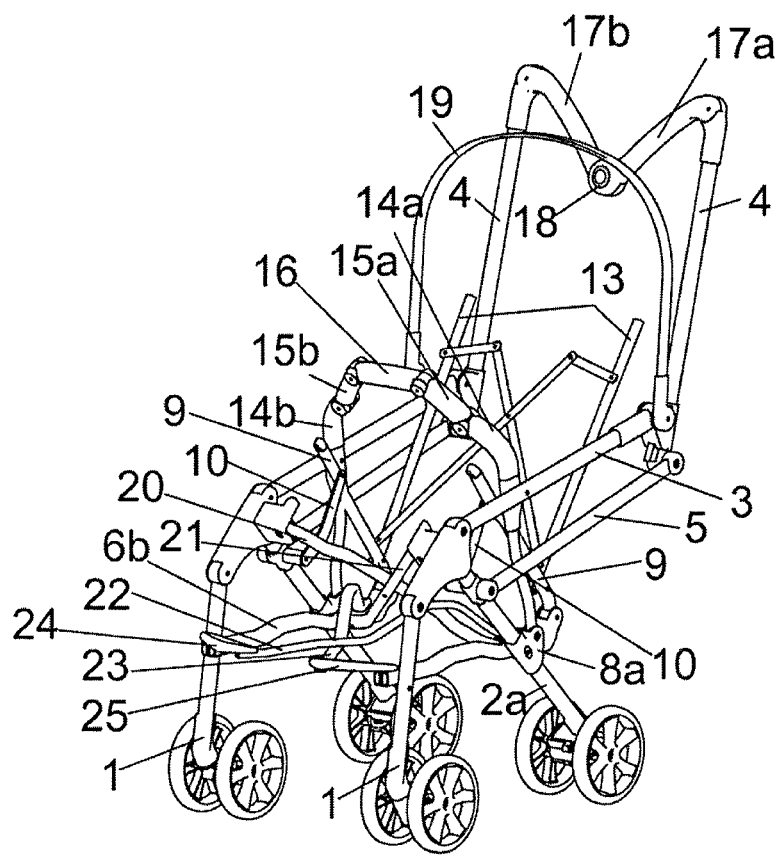
FIG. 5 is a schematic view illustrating a half-folded state of the foldable stroller frame according to the first embodiment.
Figure 6:
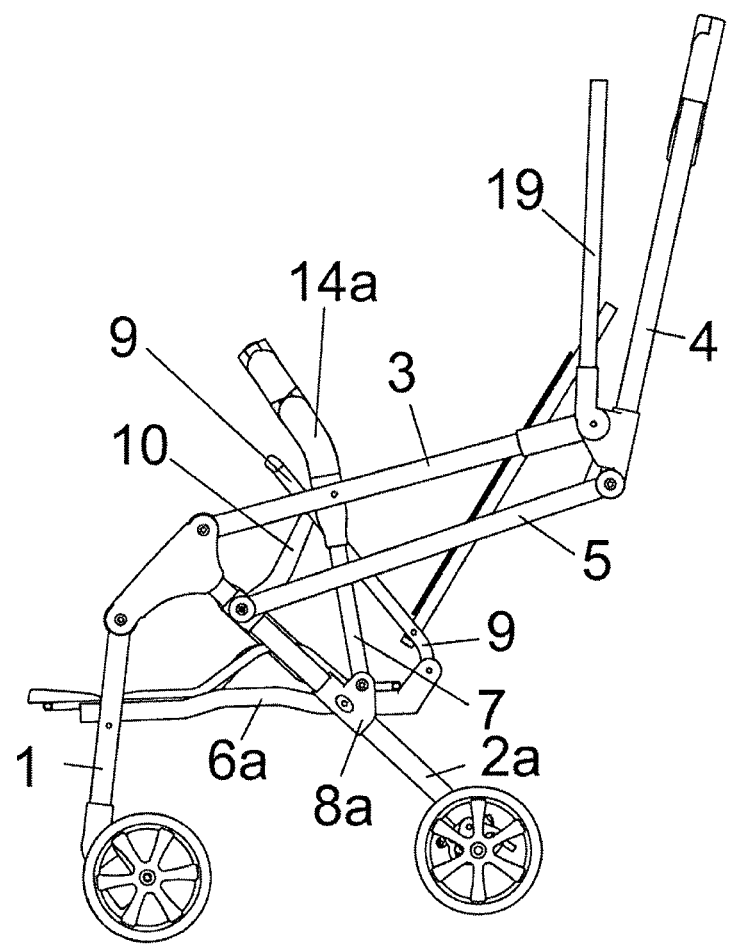
FIG. 6 is a side view illustrating a half-folded state of the foldable stroller frame according to the first embodiment.
Figure 7:
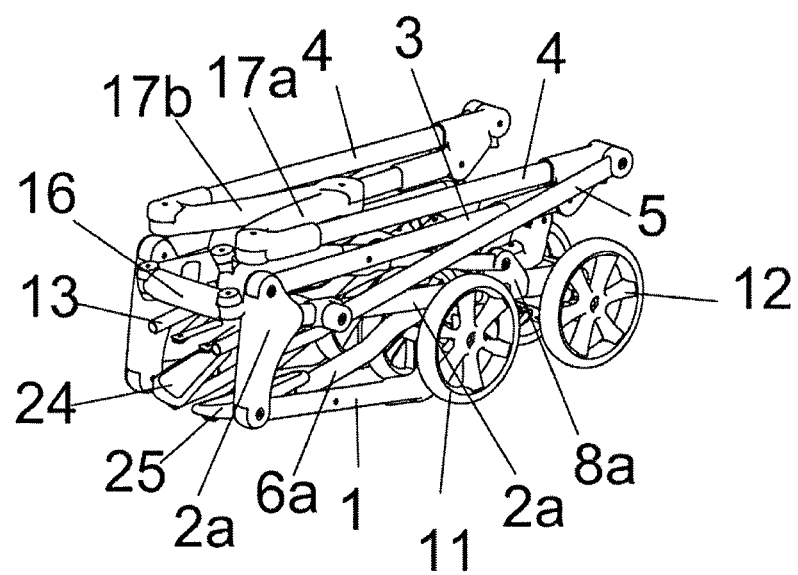
FIG. 7 is a schematic view illustrating a full-folded state of the foldable stroller frame according to the first embodiment.
Figure 8:
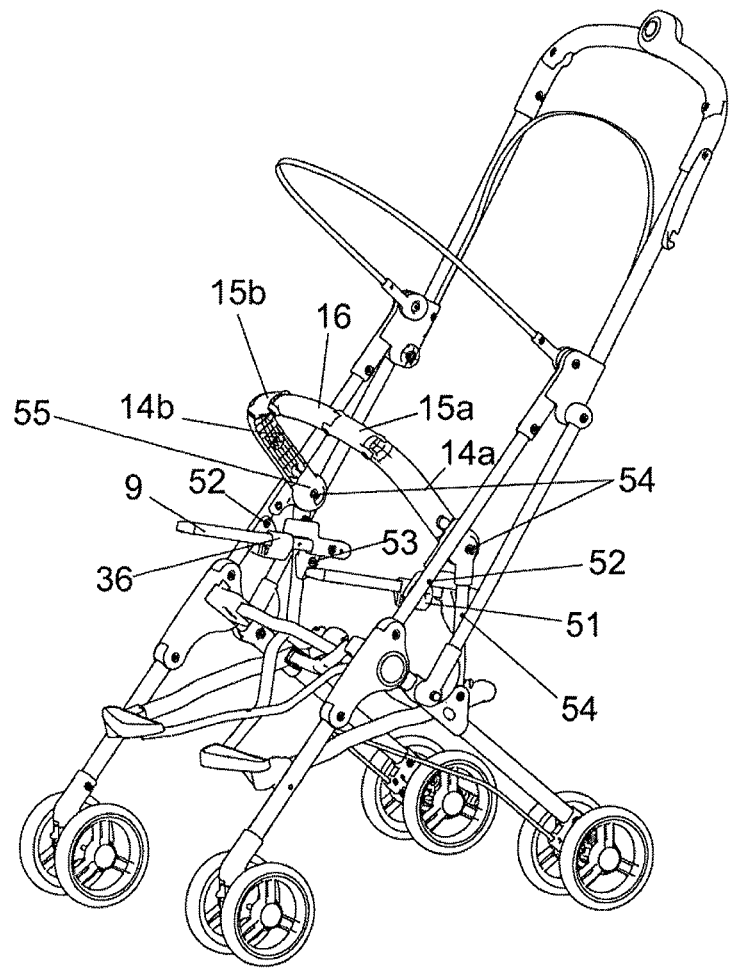
FIG. 8 is a perspective structural schematic view illustrating a foldable stroller frame according to a second embodiment.
Figure 9:
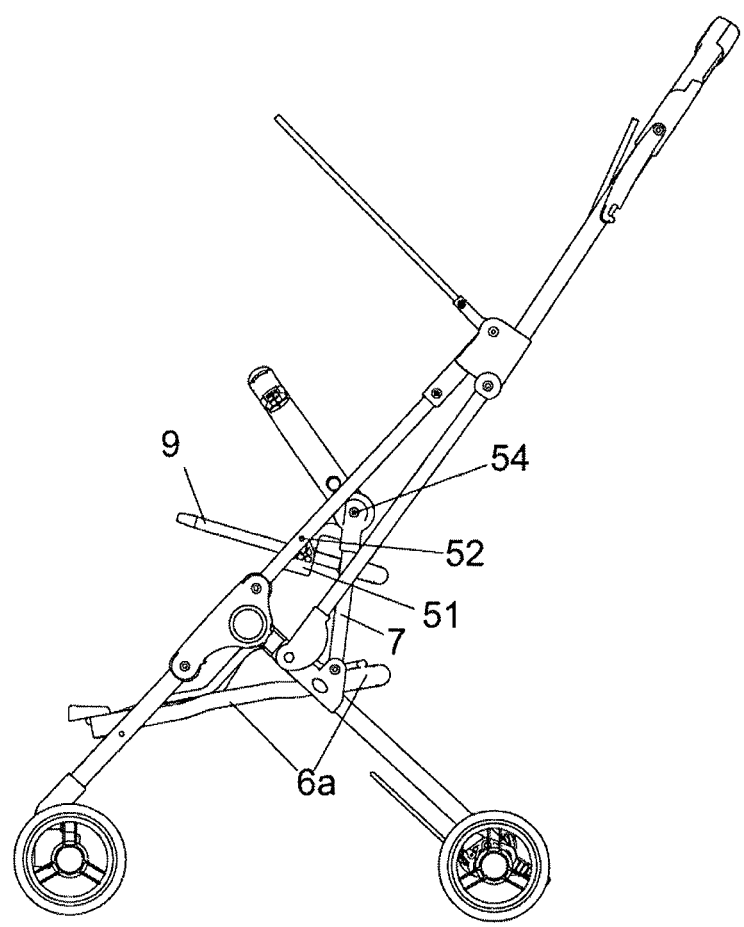
FIG. 9 is a side view illustrating the foldable stroller frame according to the second embodiment.
Figure 10:
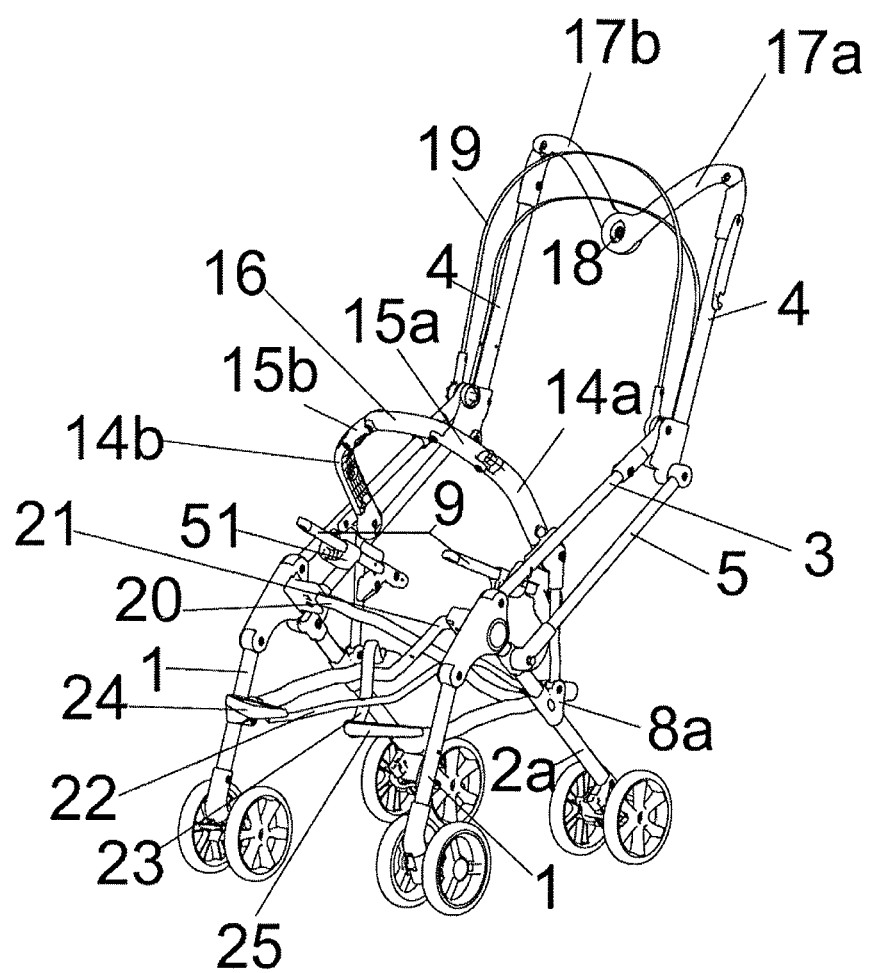
FIG. 10 is a schematic view illustrating a half-folded state of the foldable stroller frame according to the second embodiment.
Figure 11:
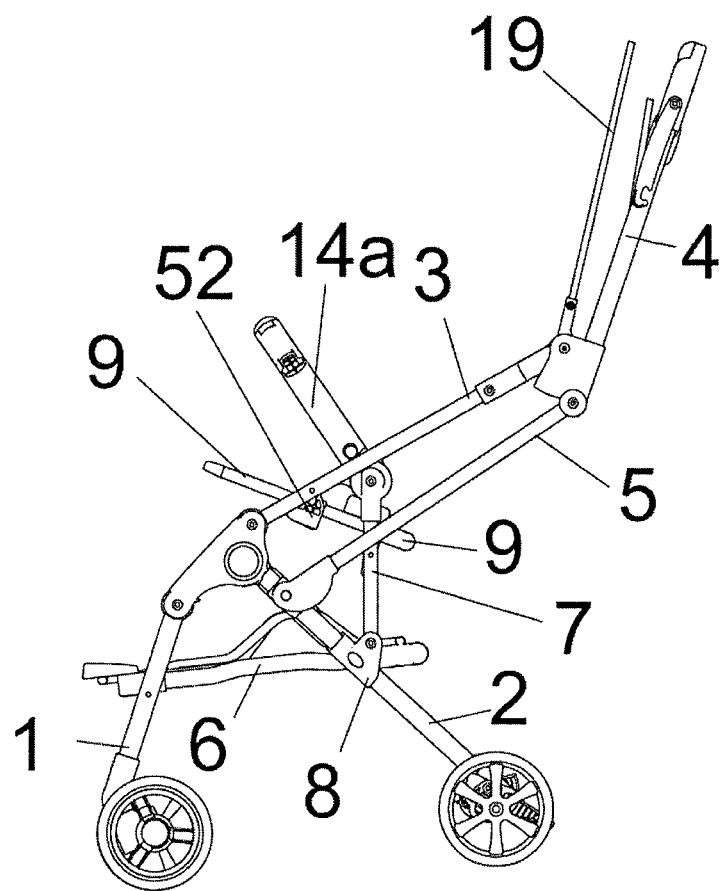
FIG. 11 is a side view illustrating a half-folded state of the foldable stroller frame according to the second embodiment.
Figure 12:
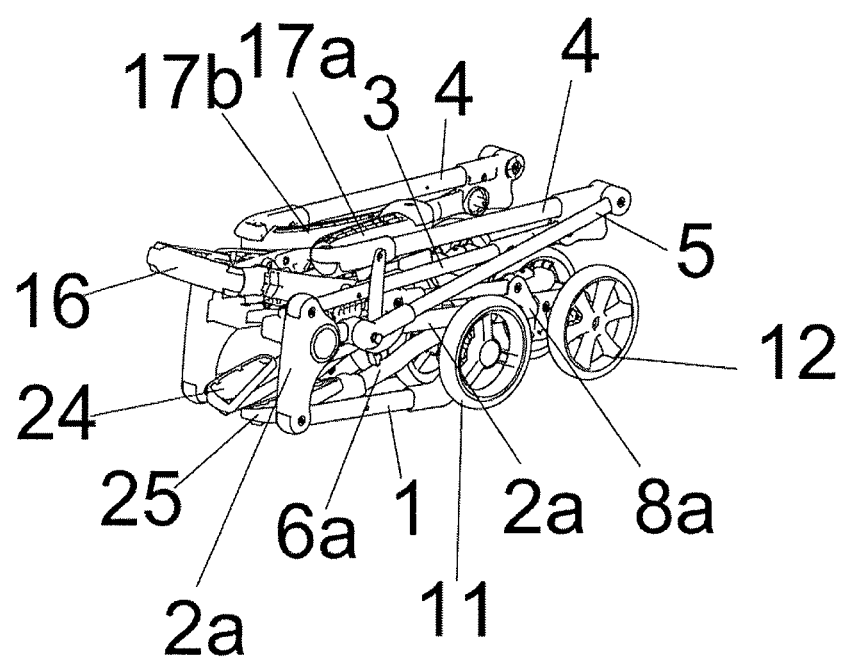
FIG. 12 is a schematic view illustrating a full-folded state of the foldable stroller frame according to the second embodiment.

According to the present embodiment, as illustrated in FIGS. 3 and 4, the foldable baby stroller may further include left and right rear supporting bars 23, 22 which are rotatably connected to each other and intersect at their middle portion by a pin 49. One end of the left rear supporting bar 23 is rotatably connected to a left front supporting bar 25 by a pin 44, and the other end thereof is rotatably connected to a right front wheel bracket link 6b of the front wheel bracket link 6 by means of a pin 48. One end of the right rear supporting bar 22 is rotatably connected to a right front supporting bar 24 by a pin 45, and the other end thereof is rotatably connected to a left front wheel bracket link 6a of the front wheel bracket link 6 by means of a pin 47. An end of the left front supporting bar 25 that is not connected to the left rear supporting bar 23 is rotatably connected to an end of the left front wheel bracket link 6a that is not connected to the right rear supporting bar 22, and an end of the right front supporting bar 24 that is not connected to the right rear supporting bar 22 is rotatably connected to an end of the right front wheel bracket link 6b that is not connected the left rear supporting bar 23 by a pin 46.

In the present embodiment, the foldable baby stroller as described above may further include upper and lower cross supporting bars 20, 21 which are rotatably connected to each other and intersect at their middle portion by a pin 42. Optionally, an end of the upper cross supporting bar 20 is rotatably connected to a right rear wheel bracket 2b of the rear wheel bracket 2 by means of a pin 40b, and the other end thereof is rotatably connected to a left U-shaped member 26a by a pin 41a. The left U-shaped member 26a is rotatably connected to the left front wheel bracket link 6a by a pin 36, and a rotation center of the left U-shaped member 26a is coaxial with that of the left front wheel bracket link 6a and the slidable sleeve 8.

One end of the lower cross supporting bar 21 is rotatably connected to the left rear wheel bracket 2a of the rear wheel bracket 2 by a pin 40a, and the other end thereof is rotatably connected to a right U-shaped member 26b by a pin 41b. The right U-shaped member 26b is rotatably connected to the right front wheel bracket link 6b by another pin 36, and a rotation center of the right U-shaped member 26b is coaxial with that of the right front wheel bracket link 6b and the slidable sleeve 8.

In the present embodiment, the foldable baby stroller described above may further include a front handrail. In particular, the front handrail may include a front handrail middle rod 16, and two front handrail links, which include left and right front handrail link 15a, 15b, arranged symmetrically and rotatably connected to two ends of the front handrail middle rod 16. An end of each front handrail link that is not connected to the front handrail middle rod 16 is rotatably connected to a front handrail plug that may include a left front handrail plug 14a connected to the left front handrail link 15a and a right front handrail plug 14b connected to the right front handrail link 15b. After the front handrail middle rod 16, the front handrail link and the front handrail plug are assembled together, the assembled configuration may be inserted into the side handrail link 7 by means of the front handrail plug.

According to present embodiment, left and right push handles 17a, 17b are rotatably connected to upper ends of the push bars 4 at two sides by means of pins 38a, 38b, respectively. The left push handle 17a and the right push handle 17b are rotatably connected to each other by a pin 39. Moreover, a locking member is disposed between the left push handle 17a and the right push handle 17b and is used to lock and unlock the left push handle 17a and the right push handle 17b. The locking member in the present embodiment may be an unlock button 18.

In the present embodiment, a locking mechanism for locking the whole stroller frame is further arranged between the side handrail 3 and the push bar 4. When the locking member unlocks the left and right push handles 17a, 17b and presses against the push bar 4 downwardly and forwardly, the locking mechanism can automatically release the locking of the whole stroller frame, thereby completing the folding of the whole stroller frame.

According to the present embodiment, the foldable baby stroller described above may further be provided with a seat bar 9 rotatably connected to the front wheel bracket link 6 by a pin 34. An end of the seat bar 9 that is not connected to the front wheel bracket link 6 is rotatably connected to a seat bar link 10 by a pin 50, and an end of the seat bar link 10 that is not connected to the seat bar 9 is rotatably connected to the rear wheel bracket 2 by a pin 33. Further, a rotation center of the seat bar link 10 is coaxial with that of the rear supporting bar 5 and the rear wheel bracket 2. A backrest bar 13 may be rotatably connected to the seat bar 9 by means of a pin 37.

In order to fold the foldable stroller frame of the present embodiment, firstly, the locking relation between the left push handle 17a and the right push handle 17b may be released by the locking member. Subsequently, the left push handle 17a and the right push handle 17b may be pressed downwardly and forwardly such that the locking mechanism between the side handrail 3 and the push bar 4 is automatically unlocked. Next, the push bar 4 may be pressed downward continually, and at this time the state of the foldable stroller frame is shown as in FIGS. 5 and 6.

After that, the whole stroller frame may be further folded forwardly and downwardly. The full folding of the whole foldable stroller frame may be achieved by the interaction relation among the components described above, and the full-folded state is shown as in FIG. 7.

A foldable stroller including the foldable stroller frame as described above may be further provided by the present disclosure. With the configuration of the foldable stroller frame as described above, the stroller frame can be folded more conveniently and quickly, and has a small volume and is convenient to carry and store after being folded, thus bring great convenience for the user. Furthermore, with the above configuration, it is possible to make the whole structure of stroller more stable as the stroller is unfolded.

Second Embodiment

The present embodiment differs from the first embodiment in that the seat bar 9 of the present embodiment is not rotatably connected to the front wheel bracket link 6, and as shown in FIGS. 8-12, the seat bar 9 is slidably provided within the seat bar slidable sleeve 51. The seat bar slidable sleeve 51 is rotatably connected to the side handrail 3 by a pin 52, an end of the seat bar 9 may be rotatably connected to the side handrail link 7 by a pin 53, and an upper end of the side handrail link 7 is rotatably connected to a front handrail socket 55. In particular, a connecting member is arranged on the side handrail and is rotatably connected to the front handrail socket 55, and a rotation center of the front handrail socket 55 is coaxial with a rotation center of the front handrail link 7 and the side handrail 3. Namely, the rotational connection among the front handrail socket 55, a front handrail link 7 and the side handrail 3 may be achieved by a pin 54, and then the front handrail may be inserted into the front handrail socket 55 by the front handrail plug.

In order to fold the foldable stroller frame of the present embodiment, firstly, the locking relation between the left push handle 17a and the right push handle 17b may be released by the locking member. Subsequently, the left push handle 17a and the right push handle 17b may be pressed downwardly and forwardly such that the locking mechanism between the side handrail 3 and the push bar 4 is automatically unlocked. Next, the push bar 4 may be pressed downward continually, and at this time the state of the foldable stroller frame may be illustrated as in FIGS. 10 and 11.

After that, the whole stroller frame may be further folded forwardly and downwardly. The full folding of the whole foldable stroller frame may be achieved by the interaction relation among the components described above, and the full-folded state is shown as in FIG. 12.

The above-described embodiments are only the examples made for illustrating the present disclosure and are not intended to limit the embodiments. Various other changes or variations may be made on the basis of the above description. It is unnecessary and impossible to exhaust all the implementations. Any modifications, equivalent substitutions and improvements that fall within the spirit and principles of the disclosure are intended to be included within the scope of the appended claims.

What is claimed is:

1. A foldable stroller frame, comprising a front wheel bracket, and a rear wheel bracket rotatably connected to the front wheel bracket, wherein
an upper end of the rear wheel bracket is rotatably connected to a side handrail, and a rear end of the rear wheel bracket is rotatably connected to a rear supporting bar, the side handrail and the rear supporting bar are rotatably connected to a push bar from different shafts, the rear wheel bracket is provided with a slidable sleeve to which a front wheel bracket link and a side handrail link are rotatably connected, respectively, an end of the front wheel bracket link that is not connected to the slidable sleeve is rotatably connected to the front wheel bracket, and an end of the side handrail link that is not connected to the slidable sleeve is rotatably connected to the side handrail.

2. The foldable stroller frame according to claim 1, further comprising a left rear supporting bar and a right rear supporting bar which are rotatably connected to each other at their middle portion, one end of the left rear supporting bar is rotatably connected to a left front supporting bar, and the other end thereof is rotatably connected to a right front wheel bracket link of the front wheel bracket link, one end of the right rear supporting bar is rotatably connected to a right front supporting bar, and the other end thereof is rotatably connected to a left front wheel bracket link of the front wheel bracket link, and an end of the left front supporting bar that is not connected to the left rear supporting bar is rotatably connected to an end of the left front wheel bracket link that is not connected to the right rear supporting bar, and an end of the right front supporting bar that is not connected to the right rear supporting bar is rotatably connected to an end of the right front wheel bracket link that is not connected to the left rear supporting bar.

3. The foldable stroller frame according to claim 2, further comprising an upper cross supporting bar and a lower cross supporting bar which are rotatably connected to each other and intersect at their middle portion,
one end of said upper cross supporting bar is rotatably connected to a right rear wheel bracket of the rear wheel bracket, and other end thereof is rotatably connected with a left U-shaped member, the left U-shaped member is rotatably connected to the left front wheel bracket link, and a rotation center of the left U-shaped member is coaxial with that of the left front wheel bracket link and the slidable sleeve;
one end of said lower cross supporting bar is rotatably connected to a left rear wheel bracket of the rear wheel bracket, and other end thereof is rotatably connected with a right U-shaped member, the right U-shaped member is rotatably connected to the right front wheel bracket link, and a rotation center of the right U-shaped member is coaxial with that of the slidable sleeve and the right front wheel bracket link.

4. The foldable stroller frame according to claim 1, further comprising a front handrail, which comprises a front handrail middle rod, and two front handrail links arranged symmetrically and rotatably connected to two ends of the front handrail middle rod, and an end of the front handrail link that is not connected to the front handrail middle rod is rotatably connected with a front handrail plug that is inserted into a side handrail link.

5. The foldable stroller frame according to claim 4, further comprising a left push handle and a right push handle rotatably connected to each other, the left push handle and the right push handle are rotatably connected to the push bar.

6. The foldable stroller frame according to claim 5, wherein a locking member is provided between the left push handle and the right push handle and is used for locking and unlocking the left push handle and the right push handle.

7. The foldable stroller frame according to claim 6, wherein a locking mechanism for locking the whole stroller frame is provided between the side handrail and the push bar, as the locking member unlocks the left push handle and the right push handle and then a user presses against the push bar downwardly and forwardly, the locking mechanism automatically releases the locking of the whole stroller frame.

8. The foldable stroller frame according to claim 7, further comprising a seat bar rotatably connected to the front wheel bracket link, an end of said seat bar that is not connected to the front wheel bracket link is rotatably connected to a seat bar link, and one end of the seat bar link that is not connected to the seat bar is rotatably connected to the rear wheel bracket, and a rotation center of the seat bar link is coaxial with that of the rear supporting bar and the rear wheel bracket.

9. The foldable stroller frame according to claim 7, further comprising a seat bar slidable sleeve rotatably connected to the side handrail, the seat bar is slidably arranged within the seat bar slidable sleeve, one end of the seat bar is rotatably connected to the side handrail link, and an upper end of the side handrail link is rotatably connected with a front handrail socket, and a rotation center of the front handrail socket is coaxial with that of the front handrail link and the side handrail, and the front handrail plug of the front handrail is inserted into the front handrail socket.

10. A foldable stroller, comprising the foldable stroller frame according to claim 1.

* * * * *